(12) United States Patent
Bell

(10) Patent No.: US 7,761,369 B2
(45) Date of Patent: Jul. 20, 2010

(54) METHOD AND APPARATUS FOR MODELING AND EXECUTING DEFERRED AWARD INSTRUMENT PLAN

(76) Inventor: Lawrence L. Bell, P.O. Box 143, Bethesda, MD (US) 20895

( * ) Notice: Subject to any disclaimer, the term of this patent is extended or adjusted under 35 U.S.C. 154(b) by 439 days.

(21) Appl. No.: 10/601,649

(22) Filed: Jun. 24, 2003

(65) Prior Publication Data

US 2006/0155621 A1    Jul. 13, 2006

Related U.S. Application Data

(63) Continuation-in-part of application No. 09/690,891, filed on Oct. 18, 2000, now Pat. No. 6,609,111.

(51) Int. Cl.
*G06Q 40/00*    (2006.01)

(52) U.S. Cl. .......................... 705/38; 705/35; 705/36 R

(58) Field of Classification Search .................... 705/35
See application file for complete search history.

(56) References Cited

U.S. PATENT DOCUMENTS 5,136,502 A * 8/1992 Van Remortel et al. ......... 705/2
5,926,792 A * 7/1999 Koppes et al. ................. 705/4
5,991,744 A * 11/1999 DiCresce .................. 705/36 R
6,304,859 B1 * 10/2001 Ryan et al. ..................... 705/38
7,606,754 B2 * 10/2009 Reiss ....................... 705/36 R
2001/0049612 A1 * 12/2001 Davis ............................ 705/4

OTHER PUBLICATIONS

Elinksy, Peter, Richardson, Terrence, Rogers, Betsy, An overview of recent developments in employee benefits, Dec. 2001, Tax Adviser, v32n12, pp. 840-852.*

* cited by examiner

*Primary Examiner*—Charles R Kyle
*Assistant Examiner*—Seth Weis
(74) *Attorney, Agent, or Firm*—Edell, Shapiro & Finnan, LLC

(57) ABSTRACT

The present invention is directed to the administration of various deferred compensation LTIP and asset account programs that can effectively reduce an individual's income or estate tax by assisting a company in the identification of appropriate employees, and through the use of a novel modeling method and apparatus to implement a deferred compensation program through a novel asset account maintenance plan that permits the employees to benefit from their deferred compensation (such as stock options, Long Term Incentive Plans, deferred compensation or life insurance benefits—"THE UNIQUE SQLUTION®"), while having a minimal financial impact on the company.

13 Claims, 6 Drawing Sheets

UNIQUE SOLUTION® EWB PLAN FOR EMPLOYEE A

| | | POLICY VALUES | | 419 EWB PLAN | | | | | | UNIQUE SOLUTION® PLAN | | | | | |
|---|---|---|---|---|---|---|---|---|---|---|---|---|---|---|---|
| | | | | | | | EMPLOYEE | | | EMPLOYER | | | | | |
| YEAR | AGE | Total premium placed in "combination policy." PREMIUM | Total death benefit in "combination policy." DEATH BENEFIT | Total cash surrender value in "combination policy." SURR. VALUE | Total premium attributed to EWB Plan*. PREMIUM | Total death benefit attributed to EWB Plan*. DEATH BENEFIT | Total cash surrender value attributed to EWB Plan*. SURR. VALUE | Imputed income to employee attributed to Plan Advantage Trust death benefit throught. IMPUTED INCOME | Employee tax on imputed income attributed to Advantage Trust death benefit through. TAX ON IMPINC | Employer premium attributed to UNIQUE SOLUTION® Plan. PREMIUM | Employer death benefit attributed to UNIQUE SOLUTION® Plan. DEATH BENEFIT | Employer cash surrender value attributed to UNIQUE SOLUTION® Plan. SURR. VALUE | Employee death benefit attributed to UNIQUE SOLUTION® Plan. DEATH BENEFIT | Employee cash surrender value attributed to UNIQUE SOLUTION® Plan. SURR. VALUE | Imputed income to employee attributed to UNIQUE SOLUTION® Plan death benefit. IMPUTED INCOME | Employee tax on imputed income attributed to UNIQUE SOLUTION® Plan death benefit. TAX ON IMPINC |
|---|---|---|---|---|---|---|---|---|---|---|---|---|---|---|---|---|
| 1 | 45 | 105,000 | 7,088,046 | 0 | 100,618 | 7,000,000 | 0 | 6,580 | 2,632 | 4,382 | 4,382 | 4,382 | 83,664 | -4,382 | 79 | 31 |
| 2 | 46 | 105,000 | 7,182,143 | 90,563 | 100,618 | 7,000,000 | 0 | 6,930 | 2,772 | 4,382 | 8,764 | 8,764 | 173,379 | 81,819 | 172 | 69 |
| 3 | 47 | 105,000 | 7,282,825 | 191,266 | 100,618 | 7,000,000 | 0 | 7,280 | 2,912 | 4,382 | 13,146 | 13,146 | 269,680 | 178,120 | 280 | 112 |
| 4 | 48 | 105,000 | 7,391,561 | 311,411 | 100,618 | 7,000,000 | 0 | 7,630 | 3,052 | 4,382 | 17,528 | 17,528 | 374,033 | 292,883 | 408 | 163 |
| 5 | 49 | 105,000 | 7,509,060 | 440,390 | 100,618 | 7,000,000 | 0 | 8,190 | 3,276 | 4,382 | 21,910 | 21,910 | 487,150 | 418,480 | 570 | 228 |
| 6 | 50 | 105,000 | 7,636,982 | 573,722 | 100,618 | 7,000,000 | 0 | 8,610 | 3,444 | 4,382 | 26,292 | 26,292 | 610,690 | 553,430 | 751 | 300 |
| 7 | 51 | 105,000 | 7,774,491 | 728,711 | 100,618 | 7,000,000 | 0 | 9,240 | 3,696 | 4,382 | 30,674 | 30,674 | 743,817 | 699,037 | 982 | 393 |
| 8 | 52 | 105,000 | 7,922,437 | 888,067 | 100,618 | 7,000,000 | 0 | 9,800 | 3,920 | 4,382 | 35,056 | 35,056 | 887,381 | 853,011 | 1,242 | 497 |
| 9 | 53 | 105,000 | 8,082,627 | 1,059,737 | 100,618 | 7,000,000 | 0 | 10,570 | 4,228 | 4,382 | 39,438 | 39,438 | 1,043,189 | 1,020,299 | 1,575 | 630 |
| 10 | 54 | 105,000 | 8,255,266 | 1,243,786 | 100,618 | 7,000,000 | 0 | 11,550 | 4,620 | 4,382 | 43,820 | 43,820 | 1,211,446 | 1,199,966 | 1,999 | 800 |
| 11 | 55 | 105,000 | 8,446,870 | 1,446,870 | 100,618 | 7,000,000 | 0 | 12,600 | 5,040 | 4,382 | 48,202 | 48,202 | 1,398,668 | 1,398,668 | 2,518 | 1,007 |
| 12 | 56 | 105,000 | 8,655,111 | 1,655,111 | 100,618 | 7,000,000 | 0 | 13,720 | 5,488 | 4,382 | 52,584 | 52,584 | 1,602,527 | 1,602,527 | 3,141 | 1,256 |
| 13 | 57 | 105,000 | 8,881,509 | 1,881,509 | 100,618 | 7,000,000 | 0 | 14,630 | 5,852 | 4,382 | 56,966 | 56,966 | 1,824,543 | 1,824,543 | 3,813 | 1,525 |
| 14 | 58 | 105,000 | 9,126,845 | 2,126,845 | 100,618 | 7,000,000 | 0 | 15,400 | 6,160 | 4,382 | 61,348 | 61,348 | 2,065,497 | 2,065,497 | 4,544 | 1,818 |
| 15 | 59 | 105,000 | 9,394,612 | 2,394,612 | 100,618 | 7,000,000 | 0 | 15,960 | 6,384 | 4,382 | 65,730 | 65,730 | 2,328,882 | 2,328,882 | 5,310 | 2,124 |
| 16 | 60 | 105,000 | 9,684,216 | 2,684,216 | 100,618 | 7,000,000 | 0 | 16,450 | 6,580 | 4,382 | 70,112 | 70,112 | 2,614,104 | 2,614,104 | 6,143 | 2,457 |
| 17 | 61 | 105,000 | 9,998,537 | 2,998,537 | 100,618 | 7,000,000 | 0 | 17,010 | 6,804 | 4,382 | 74,494 | 74,494 | 2,924,043 | 2,924,043 | 7,105 | 2,842 |
| 18 | 62 | 105,000 | 10,339,833 | 3,339,833 | 100,618 | 7,000,000 | 0 | 18,130 | 7,252 | 4,382 | 78,876 | 78,876 | 3,260,957 | 3,260,957 | 8,446 | 3,378 |
| 19 | 63 | 105,000 | 10,710,571 | 3,710,571 | 100,618 | 7,000,000 | 0 | 20,020 | 8,008 | 4,382 | 83,258 | 83,258 | 3,627,313 | 3,627,313 | 10,374 | 4,150 |
| 20 | 64 | 105,000 | 11,112,562 | 4,112,562 | 100,618 | 7,000,000 | 0 | 22,050 | 8,820 | 4,382 | 87,640 | 87,640 | 4,024,922 | 4,024,922 | 12,679 | 5,071 |

ASSUMPTIONS: EMPLOYER TAX RATE: 40.00%

FIG. 6

METHOD AND APPARATUS FOR MODELING AND EXECUTING DEFERRED AWARD INSTRUMENT PLAN

This application is a Continuation-in Part of U.S. patent application Ser. No. 09/690,891, filed Oct. 18, 2000, now U.S. Pat. No. 6,609,111.

I. BACKGROUND

A. Field of the Invention

The present invention relates to a computer system and method for modeling and administrating a deferred award instrument plan.

B. Background of the Art

Increased competition among companies has led to the granting of benefits such as deferred awards, stock options, life insurance and deferred compensation as a tool to both recruit and maintain highly skilled labor. Stock options are used as forms of compensation that reward employees for their labor. Employer corporations grant employees the right to purchase stock in the employer at a fixed price. As new products or services are introduced and the stock price rises, the employee's stock options become more and more valuable. This option, for example, may be given for past service or as incentive for future performance.

The granting of benefits such as stock options involves certain issues related to benefits measurement and timing. The price at which the employee has the right to purchase the stock or other benefit (which is also the value of the benefit when received) is hereinafter referred to as the Grant Price. If the options are not exercised in a predetermined period of time, they often lapse. The difference between the Grant Price and the trade price of the stock in the appropriate exchange, or the benefits received by way of deferred compensation or life insurance (hereinafter "Market Price" of "FMV") is referred to as the gain.

There are several different types of stock options or benefits that can be granted. Options may be Qualified, commonly referred to as Incentive Stock Options (ISO) that are governed by Sections 422, 424, Deferred Compensation Section 83, and Deferred Compensation Section 457, proposed Section 459, and other benefit provisions of the United States Tax Code. Options may also be Non-Qualified, commonly referred to as Non-Qualified Options (NSO).

There are numerous reasons why it is not desirable to issue too many stock options and/or have them exercised. First, the limited life of most options has cash liquidity ramifications on the employee. The selling of stock to cover stock option costs by key employees can have a negative impact on the company.

A second downside to receiving benefits are taxes. If the benefits are received while the employee is alive, the gain is immediately subject to ordinary income tax. For the benefit that is held, the amount of appreciation over the gain is subject to capital gains taxes when it is ultimately sold. The gain on the stock or benefit that is not held and sold immediately upon exercise of the options is subject to ordinary income tax. Alternative minimum tax is applicable to the gain of an ISO or benefit when it is received and capital gains tax is applicable on the difference between the Grant Price and the ultimate sales price of the stock or benefit.

If an NSO or ISO is not exercised when the employee is alive, the added burden of estate tax must also be computed. For example, an employee's family can expect to receive only 12% of the proceeds after taxes on a stock option that has a Market Value that is twice the grant price. The greater number of options awarded the larger the problem becomes. If an employee does not have enough cash to satisfy the Grant Price and taxes associated with an exercise, the employee is forced to sell stock, which only aggravates the tax consequences and reflects poorly on the company.

Many of the issues associated with stock option plans are also present with other benefit and deferred compensation programs offered by companies today. Additionally, conventional benefit and deferred compensation programs are difficult to bring into compliance with Financial Accounting Standards Board (FASB) and International Accounting Standards Board rules (IASB) (FAS 87, 106, 123, AO 25 and IAS 19). Many of these programs also require a significant outlay by the company to compensate or reward an employee or member. These outlays can detract from a company's bottom line in the near term. What is therefore needed in the art is a new program, method and apparatus by which a company can compensate its best employees over an extended period, thus minimizing the employees' tax consequences, while at the same time allowing the company to take maximum tax deductions and recoup many of the costs associated with the administration of these compensation programs and bring programs into harmony with FASB and IASB.

II. SUMMARY OF THE INVENTION

The present invention is directed to solving the aforesaid problems by providing a unique computer system and computer program for assisting the company's identification of appropriate employees, through the use of a novel modeling method and apparatus. Another aspect of the invention includes a program that permits the employee to gain from his/her benefit, such as stock options, deferred compensation and other Long Term Incentive Programs (LTIP) such as life insurance benefits, while having a minimal impact or charge to earnings on the company. Further, the present invention includes systems that implement a financial management plan for Corporate-Owned Retirement Equalization (CORE™) which avoids Corporate-Owned Life Insurance (COLI) excesses as related in the *Wall Street Journal* and observed in the Enron/Andersen scandals. The present invention also provides a program for global harmonization of benefits that minimizes tax and maximizes employee benefits, known as Global Logic Omnibus Benefits UNIQUE SOLUTION® (GLOBUS™). GLOBUS™ also maximizes tax advantages for the company without creating a charge to earnings. The present invention will meet both FASB 123 and IASB 19 standards for employee benefits without creating a charge to earnings.

Briefly described, the present invention provides an automated THE UNIQUE SOLUTION® Plan that permits employees to benefit from their stock options, or other deferred compensation and LTIP programs, while minimizing the tax consequences and negative impact on the company. Embodiments of THE UNIQUE SOLUTION® Plan are provided for both for-profit and non-profit/not-for-profit entities (Mercy Organization Employee Benefit UNIQUE SOLUTION®—MOEBUS™), including corporations, business leagues under Section 501(c)(6) and labor organizations under Section 501(c)(5) (the benefits of both of which inure to the membership), or other entities (hereinafter sometimes referred to as companies). These various THE UNIQUE SOLUTION® Plans will be encompassed hereinafter for simplicity by the term "THE UNIQUE SOLUTION® Plan". The present invention also provides a combination THE UNIQUE SOLUTION®/Employee Welfare Benefit (EWB) Plan that additionally allows a company to take maximum advantage of tax deductions and benefits which may be associated with the plans. The present invention comprises a method and system for modeling the programs to determine if the programs are appropriate for a given individual and company, as well as a method of maintaining and operating the individual elements of the invention.

A further object of the present invention is to provide a method and computer system for identifying individuals from a predetermined pool that fit predetermined company goals for inclusion in THE UNIQUE SOLUTION® Plan, and the combination THE UNIQUE SOLUTION®/EWB Plan.

A further object of the present invention is to provide a method and computer system for effective and efficient financial accounting management to implement THE UNIQUE SOLUTION® Plan, and the combination THE UNIQUE SOLUTION®/EWB Plan.

The present invention is directed to a method for identifying and administering deferred award instrument plans through a computer system, said method comprising the steps of: identifying at least one participant in said deferred award plan; retrieving financial data related to deferred compensation (such as stock options, LTIP, or other benefits) corresponding to said identified participant and to an employee welfare benefit pursuant to an employee welfare benefit plan for said participant; determining actuarial reasonable costs for a current death benefit computing a gain or spread associated with said deferred compensation; establishing financial accounting for said gain or spread if appropriate and/or necessary; determining whether a life insurance policy has been purchased by or on behalf of said participant, said life insurance policy combining features of a deferred compensation plan or asset accumulation and an employee welfare benefit plan; purchasing a life insurance policy if one has not been purchased by or on behalf of the participant; determining whether an endorsement has been executed to provide co-ownership of the benefit to the Employer and Employee where desired; monitoring and paying at least one premium for said life insurance policy; and notifying said participant that an nth payment associated with said life insurance policy has been paid. After the nth payment has been made, the employee or employer, depending on who owns the policy, may borrow, take advances or withdrawals against the policy with minimal or no tax consequences, in accordance with IRS regulations. When the employee dies, his estate tax may also be reduced as a result of this arrangement which also substantially reduces the gift or transfer tax.

The present invention is also directed to a method of modeling deferred award instrument plan programs comprising the steps of: inputting models factors; retrieving human resource data; retrieving deferred compensation data; retrieving asset accumulation data and employee welfare benefit data; retrieving fair market value information relating to said data; computing company cost and length of program; and storing said retrieved and computed data. The method may also include converting said human resource data to a deferred award instrument plan format or converting said deferred compensation, asset accumulation LTIP and/or said employee welfare benefit data to a deferred award instrument plan format.

It is also contemplated that the present invention may include inputting weighing indicators corresponding to said model factors and displaying at least a predetermined portion of said retrieved and stored data based on said weighing indicators.

The present invention is also directed to an apparatus for implementing a deferred award instrument plan comprising: a processor; memory operationally attached to said processor; an input device operationally attached to said processor; a display device operationally attached to said processor; and wherein said memory comprises a deferred award instrument plan program comprising the steps of inputting models factors; retrieving human resource data; retrieving deferred compensation asset accumulation and employee welfare benefit plan data; retrieving fair market value information relating to said data; computing company cost and length of program; and storing said retrieved and computed data.

With these and other objectives, advantages and features of the invention that may become apparent, the nature of the invention may be more clearly understood by reference to the following detailed description of the invention, the appended claims, and to the several drawings attached herein.

III. BRIEF DESCRIPTION OF THE DRAWINGS

FIG. 6 is a chart showing costs, benefits and values for an alternate THE UNIQUE SOLUTION®/EWB plan and policy according to a third embodiment of the invention.

IV. DETAILED DESCRIPTION OF THE INVENTION AND OF THE PREFERRED EMBODIMENTS

The present invention may be implemented in whole, or in part, on a computer with a Pentium processor, hard drive, 16 Mb of RAM and by running an operation system comparable to Windows '95. It is expressly contemplated that at least one monitor is attached. Preferably a printer, modem and overhead projector are also attached thereto. It is expressly contemplated that the present invention may be implemented on a dedicated computer system. At least one input is provided for receiving modeling parameters. It should be noted that any combination of computer hardware (processor, monitor, memory, server, network, etc.) can be used to create the building blocks of the present system, as shown. It should also be noted that any of the software functions, steps or elements described herein can be implemented in any conventionally known computer.

Figure 1:
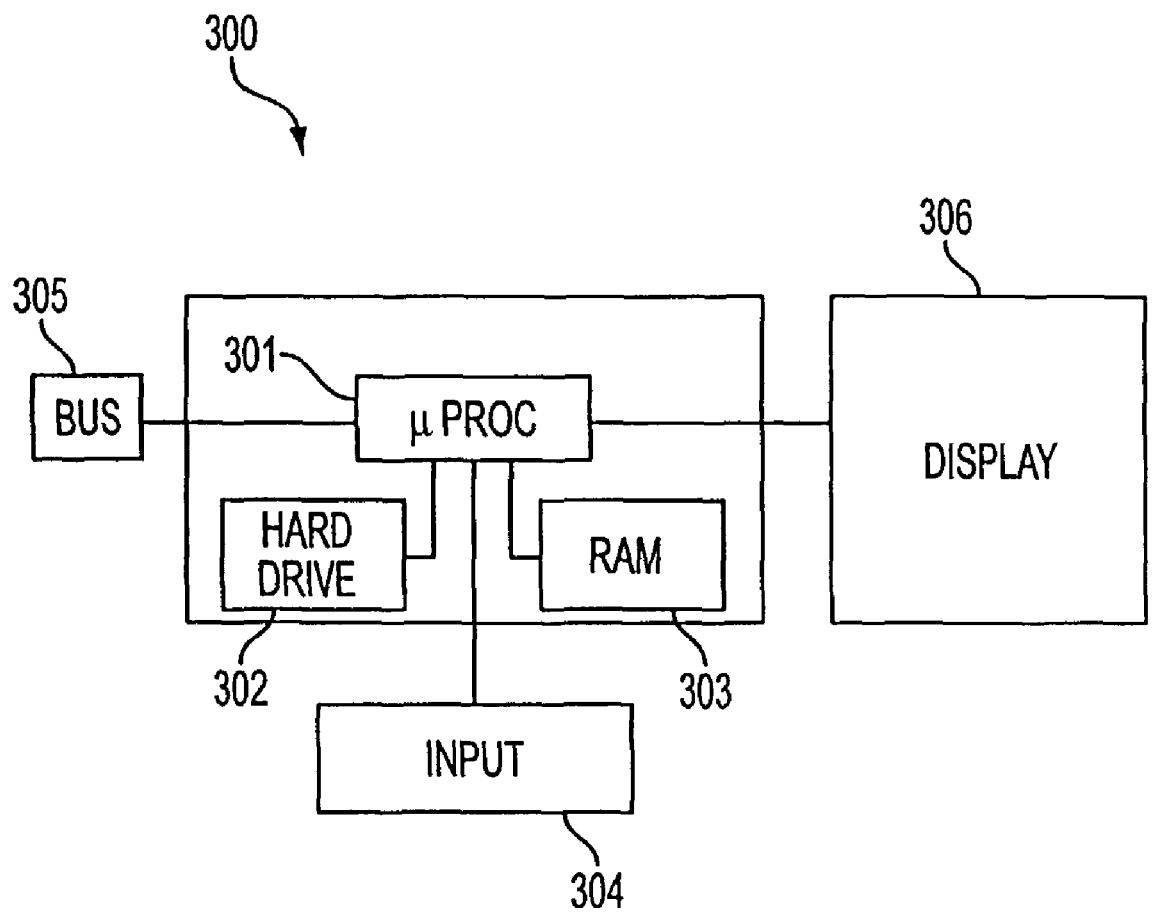
FIG. 1 is an apparatus for implementing the modeling program.

A preferred embodiment of an apparatus 300 to carry out the modeling program is shown in FIG. 1. A processor 301 is provided with a hard drive 302 and RAM 303. The hard drive 302 may be used to store predefined processes or data. The processor 300 is operationally connected to a manual input means, such as a keyboard and/or mouse 304. A bus 305 is provided that may comprise a conventional bus, infrared communication port, modem or the like. The bus 305 may be used to operationally attach the apparatus 300 to a modem, database or other source of data. A display or projector 306 is operationally connected to the processor 301. Those of ordinary skill in the art will realize that this is but one embodiment of an apparatus capable of implementing the modeling program and/or financial accounting management program and that this embodiment may be modified using conventional components.

The present invention analyzes data that may be input and stored on the hard drive or that may be retrieved from other databases. It is expressly contemplated that the present invention may be designed to interface with a company's human resource (HR) data files to extract employee-related information. Extraction of HR data may be performed with the modeling program, in advance of running the modeling program, or after an initial set of modeling parameters has been input, but before final modeling factors are decided upon. It is expressly contemplated that financial information may likewise be obtained from a company's database, commercially available database, or retrieved from financial data stored on a computer's hard drive (not shown).

A. Program

Figure 2:
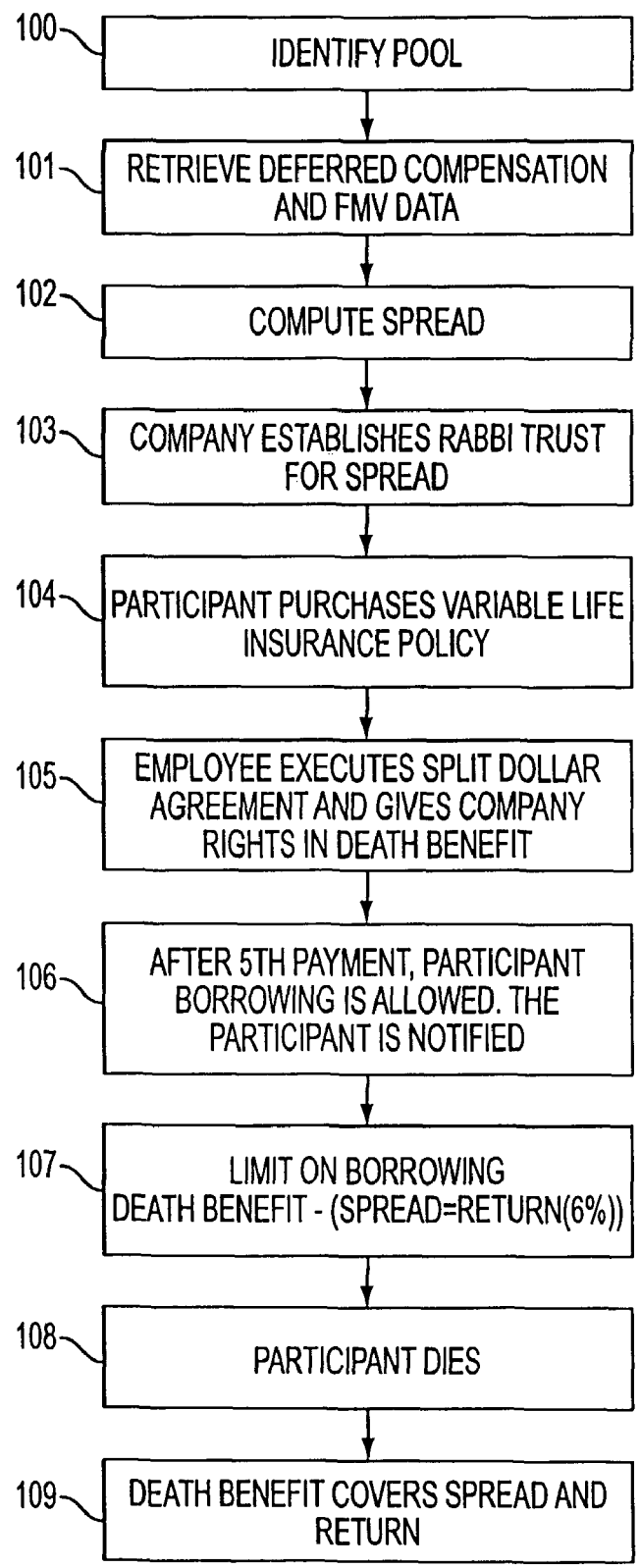
FIG. 2 is a schematic flow of the preferred embodiment of the computer program.

The steps of the program forming the preferred embodiment are set forth in FIG. 2. Although the steps are shown in order of intended implementation, those of ordinary skill will recognize that the steps in some cases may be rearranged or performed simultaneously.

The program is preferably designed to work with a for profit corporation ("Employer"), but it is expressly contemplated that the program, modeling program and financial management administration program (hereinafter referred to as asset account) may be used in other applicable settings. For example, they can be implemented by a consulting company, insurance company, professional service company, partnership, Limited Liability Company, Limited Partnership, any pass-through entity, non-profit, 501(c)(3), 501(c)(5) and 501(c)(6) organization for its employees and members, trust company, or any combination thereof. Other employer and corporate entities are also contemplated herein. The program generally maintains a qualified or non-qualified deferred compensation or LTIP plan ("Plan") (e.g. a stock option plan deferred compensation, asset accumulation or other LTIP plan such as life insurance benefits) for the benefit of its employees and members, in particular highly compensated employees, officers and directors. The Plan provides an incentive for the employees, officers, directors and other key employees of the Employer to join or remain in the employment of the Employer and/or to maintain and enhance the Employer's long-term performance record through offering incentive awards. The Plan allows the Employer to issue LTIP benefits such as stock options, stock and membership benefits to employees/members and qualifying non-employee directors and members (together, "Employees") who are participants. In the case of stock options, the plan would permit an Employee to purchase a share of the Employer's common stock ("Common Stock") for a price equal to the fair market value of the Common Stock on the date of issuance. An Employee cannot transfer the stock options under the Plan other than by gift or assignment, and the Employees, as holders of a stock option under the Plan, do not receive the rights of shareholders until they exercise the stock option and the Employer issues the shares.

Due to the significant value of the stock options or LTIP after being exercised and the fact that the ownership of the Employer will change after the stock issuance, the Employer may desire to modify the terms of the Plan ("Modified Plan") to enable the Employer to take certain actions with regard to the outstanding, but unexercised, stock options, as well as other benefits. The Modified Plan will enable the Employer to preserve the current ownership of the Employer and at the same time recover expended funds and realize tax and accounting benefits through a THE UNIQUE SOLUTION® Plan, and/or a combination THE UNIQUE SOLUTION®/EWB Plan and CORE™ (the "Alternate Plan" as hereinafter described). In order to determine whether modification is appropriate, the Employer will perform a cost analysis of the programs to determine if the programs are consistent with the Employer's goals.

Under the Program, the Employer will seek to have the Employee agree to the following modifications to the Plan. When an Employee exercises his or her option by providing notice under the Modified Plan to the Employer, the Employee will be making an election to receive benefits, which may include cash, at a subsequent time. The Employer will determine whether the value of the benefit exceeds an exercise price of more than a dollar amount (the "Threshold") determined by the Employer. The Employer has determined that the exercise of many benefits under the Plan greater than the Threshold will be detrimental to the cash flow of the Employer since the Employer must use its resources to acquire the benefit that has a purchase price greater than the original cost. In addition, the exercise of many options or benefits may result in a change of majority control of the Employer or adversely affect the balance sheet or income statement. By controlling the issuance of benefits pursuant to the Modified Plan, the Employer can also engage in better long-range planning based on benefits accounting reporting and management of the Company. The Employer has proposed the modifications contained in the Modified Plan to provide a fair and equitable means to minimize the detrimental effect of the exercise of the options, distribution of benefits and charge to earnings on the Employer.

Options or benefits greater than the Threshold will be the same as the original options or benefits except that the Employer (i) will reflect the gain for accounting purposes to provide the benefits under the Modified Plan; (ii) the Employee will agree to purchase or provide the benefits from the Plan and Modified Plan; and (iii) the Employee will not receive stock upon exercise of the options or LTIP. As additional consideration for having an Employee consent to the terms of the Modified Plan, the Employer may convert the arrangement into a deferred compensation or an asset accumulation device. The options under the Modified Plan will not have a fair market value when granted and upon an event triggering the Modified Plan with release of its endorsement.

In another embodiment of the invention, the Employer will determine if an Employee Welfare Benefit (EWB) Plan, is applicable to the Employee or member (Employer). Under the EWB Plan, the Employer will fund the premiums on a group-term life insurance benefit based on the Employee or Member. The life insurance benefit has no cash surrender or accrual value, and is funded over the working life of each Employee or Member covered. Under current and proposed Internal Revenue Service regulations, the cost of the premiums paid for the EWB Plan life insurance benefit is fully deductible to the Employer when paid. Under these circumstances, the life insurance benefit may be described as a death benefit for the Employee or Member. Upon termination of participation by the Employee or Member, the owner of the policy retains ownership with the lapsing of the endorsement and is entitled to all benefits associated with the policy.

Additionally, the Employer may also fund a deferred compensation plan for the Employee. This deferred compensation or LTIP plan may be more broadly referred to as THE UNIQUE SOLUTION®. THE UNIQUE SOLUTION® plan will work to minimize tax consequences to the Employee and can involve any type of deferred compensation or asset accumulation, e.g. such as life insurance. This deferred compensation plan or THE UNIQUE SOLUTION® Plan or CORE™ will also require payment of premiums which will typically be made by the Employer. THE UNIQUE SOLUTION® Plan can take the form of a life insurance policy to be owned by the Employee or Employer. After an nth payment for the premium for the current death benefit life insurance has been made and the Employee is not longer in the EWB, the policy will allow the Employee to borrow against the accrued cash value which is associated therewith. The Employer will receive a tax deduction for the payment of the cost of the current death benefit in a THE UNIQUE SOLUTION® Plan.

When the deferred compensation arrangement just described for THE UNIQUE SOLUTION® Plan is utilized with a non-profit employer, corporation 501(c)(3), 501(c)(5), or 501(c)(6) for its employees or members or any passthrough or other entity the Plan complies with Internal Revenue Service Code Sections 61, 83, §457(f)(2)(c) and §457 (e)(11) and Table 2001.

The Alternate Plan combines some of the preferred features associated with the EWB Plan and the deferred compensation THE UNIQUE SOLUTION® life insurance benefits and CORE™, GLOBUS™ and MOEBUS™. According to this hybrid plan, premiums are actuarially determined in line with Section 419A(2) for the Employee and are split into two categories for payment. Actuarially determined premium payments which go into the EWB Plan portion are managed separately from those that go towards THE UNIQUE SOLUTION® portion premiums. The Employer can receive the full tax deduction for the EWB premiums when paid. The asset account will create no charge to earnings and can be established to fund the other premiums, i.e. to ensure that any gain associated therewith is adequately funded and reflected on the books of the company. Depending on how the policy is owned, the Employer or Employee may borrow against the cash value of THE UNIQUE SOLUTION® portion, and incur little tax liability. If the amount borrowed is not paid back before the Employee's death, then that amount is simply deducted from the death benefit.

Thus as shown in FIG. 2, the first step in the program is to identify the pool 100 of candidates who will be evaluated for participation in the program. The Employer may wish to evaluate a number of different employees from conventional HR data to determine what financial impact participation all or part of the pool will have. The total level of compensation, the number of stock options held, the age of the employee or other factors may be used by the Employer to decide which employees to place in the pool of candidates who will be considered for participation in any of the plans.

After the pool is identified, the next step is to retrieve identified employees' deferred compensation or asset accumulation data 101. The deferred compensation data may include the amount of stock options they have been awarded, the type of exercisable option it is, the expiration date of the option, the grant price, the benefits provided or accrued, the participant's age and other relevant human resource data. In this step, the Fair Market Value of the stock may be determined or the fair value of benefits is projected. In the modeling application, it may be preferable to project what range a company's stock may fall in during a given time frame. If the Employer's data is kept in a format that is compatible with the implementing software and hardware, the data can be directly imported from the Employer. It is expressly contemplated that an extraction module can be used that places the Employer's data in the form required by the program's implementing software and hardware.

In the case of THE UNIQUE SOLUTION® or Alternate Plans, other information may have to be retrieved pursuant to step 101 relating to deferred compensation LTIP data or asset accumulation as well as to employee welfare benefit data. For example, actuarial data relating to the Employee may also be necessary, such as projected life expectancy based on health risk factors, the amount of death benefit and the like. This information will be necessary to help determine the cost of the employee welfare benefit, e.g. death benefit, associated with the EWB portion of the Alternate Plan.

In step 102 the spread or gain is determined by calculating the difference between the Grant Price and the FMV or projected Fair Value or Market Price. As the decision to enter the program is made in advance of its implementation, the implementing software and hardware can be capable of predicting a range of stock prices over a given period of time that is in keeping with the Employer's objectives. This Fair Value Market Price predictor may be part of the present system or integrally provided therewith from commercially available investment data sources.

In the case of a THE UNIQUE SOLUTION® or Alternate Plan for step 102, other ways of calculating the spread or gain may be chosen. For example, under these plans the spread may simply be the level of deferred compensation or extended income which the Employer has agreed to provide to the Employee. In other circumstances, the Spread may equal the cost of the premiums necessary to purchase and maintain a certain monetary level of life insurance for the Employee pursuant to the Plan. In this way, the Employer will know what the cost of funding the premiums associated with the life insurance policy will be.

If THE UNIQUE SOLUTION® or Alternate Plan is implemented, the next step is to establish financial accounting management system 103.

The Employee participant then purchases a life insurance policy (the Policy) at step 104. Alternatively the Policy may be purchased on behalf of the Employee, by the Employer for example. Under the asset account component, the Employer will carry the spread or gain (e.g., the cost of the premiums) on the books of the company established on behalf of the Employee. The Employer will establish the asset account to provide a source of funds to the Policy owned by the Employee on the life of the Employee. The spread or gain deposited into the asset account must be sufficient to pay each year the portion of the annual policy premium equal to the cost of the life insurance protection provided under the Policy but not necessarily the cost of the current death benefit. The Employee would maintain the Policy during his or her lifetime to avoid possible taxation. Any benefit and increases under the Policy will be the sole and exclusive property of the Employee.

Under the DASO® Plan, THE UNIQUE SOLUTION® Plan or CORE™ the Employee and/or the Employer pursuant to the endorsement will contribute sufficient premium payments under the Policy over the employee or member's working life, so that the life insurance protection provided under the Policy is maintained. Each year the Employee or Member receives an economic benefit. Notice of the benefit can be automatically generated by the computer system. This assures tax benefits for the Employee or Member. Thus, when the last premium payment is paid, and no additional premium payments are required under the Policy (e.g. termination from Plan), the Employee may borrow the cash value from the policy under THE UNIQUE SOLUTION® Plan or THE UNIQUE SOLUTION® portion of the Alternate Plan. The insurance proceeds will be paid to the Employee's beneficiaries. The Employer will not be required to issue any further benefits to the Employee or Member under the Modified Plan as previously described. Instead, the benefit of LTIP may take the form of the life insurance benefits just described.

The asset account provides satisfactory assurance to the Employee that the Spread or gain has been segregated to provide the benefits identified in the Program. The asset account is not intended to have a tax effect on the Employee, and the funds within the asset account will remain subject to the claims of the Employer's creditors in case of bankruptcy or insolvency and will not create a charge to earnings. Under the Alternate Plan, the asset account ensures that only the deferred compensation LTIP premiums are paid. Those premiums which fund the EWB life insurance portion are maintained separately and apart from the asset account. As set forth above, the premiums paid into the asset account will not create a charge to earnings or the Employee. Premiums paid into the EWB portion of the alternate Plan are normally fully tax deductible to the Employer when incurred. Maintaining the premiums separately thus helps to maintain this favorable corporate tax treatment from the IRS and facilitates FASB/IASB accounting.

When the Policy is purchased a co-ownership endorsement is executed 105 that gives the EWB the right to receive at least a portion of the death benefit associated with the Policy. The Policy can be purchased online, using interactive capabilities of, for example, the Internet. The Company receives that portion of the death benefit equal to the portion not paid for by the EWB, those amounts are annually actuarially determined.

Under this co-ownership endorsement, which can be administered by the computer program, each year the Employer or the Employee will pay the portion of the annual policy premium equal to the cost of the life insurance protection under the Policy offset by the cost of the current death benefit, actuarially determined and paid by the EWB. The Employer or the Employee will apply the difference to the obligation, but the Employee or Employer is liable for any shortfall in the premium depending upon who is the co-owner of the policy. Any surplus of spread or gain after the payment of the policy premiums necessary to pay the costs of the life insurance protection under the Policy will be the sole and exclusive property of the asset account. The co-ownership endorsement requires the Employer or Employee to advance the remainder of the annual premium for the working life of the participant.

After termination of the Employee or Member from the plan (step 106) the participant is notified by an appropriate output (e-mail, intranet posting, automatic written letter, etc.) that tax-free borrowing against the Policy, where applicable, may begin. The participant's borrowing however is limited at step 107 that analyzes the insurance death benefit and compares that with the Spread or gain. The Employee must maintain the Policy during his or her lifetime to avoid taxation. The asset account administration software may also be used to monitor the Policy and ensure that all-applicable tax or other obligations that may affect the Employer's and Participant's rights are attended to. Any factor, such as payment of any taxes related to the §61, 83, 457(e)(11) or Table 2001, may be automatically monitored by the asset account management software to ensure that all payments are timely made and FASB/IASB compliance is maintained for compliance and global harmonization.

In the case of the Alternate Plan, the administrative software will monitor both the portion attributable to THE UNIQUE SOLUTION® and the Financial Management account to determine values.

The program may be implemented using a single dedicated computer or may comprise multiple computers that share information. For example, it is expressly contemplated that a single system can be implemented for modeling, while a second system may receive the data that corresponds to the selected employees and then implements and maintains the asset account. It is also expressly contemplated that different groups may be responsible for different portions of the programs implementation.

In view of this program the following modeling and asset account systems have been developed. Those of ordinary skill in the art will recognize that the present invention may be modified in keeping with the spirit of the present invention.

B. Modeling

The modeling program 200 is contemplated to be the first portion of the system that is used. The program 200 may reside on a computer or on a server. It is expressly recognized that the modeling program may be combined with other portions of the present invention or may be implemented separately.

There are several variable factors that may effect the Employer's decision to participate in the program. The modeling program permits multiple variables to be tested to see what impact the factors have on implementing the program. The modeling program is designed for use by the Employer, insurance company, program manager, employee or any combination thereof. The modeling program is designed to be used by a single entity but it is expressly contemplated that the modeling program may be divided into sub-parts that are performed by different entities.

When the Employer implements the program it can tie up its cash reserves. The Employer often uses its cash to fund the asset account to pay for premiums on the life insurance policy. The Employer does not receive its cash back but rather receives a tax deduction. The Employee also will be providing an asset in line with FASB 123, EITF 85-4 and IASB 19 which must be monitored and compared with other investment opportunities the Employer would otherwise make. In an alternate embodiment, the Employer's costs will be offset by an economic evaluation of the impact on the company of a participant selling shares into the market or providing benefits. The modeling program is thus designed to provide the Employer with relevant information so as to decide whether or not to implement the program.

Figure 3:
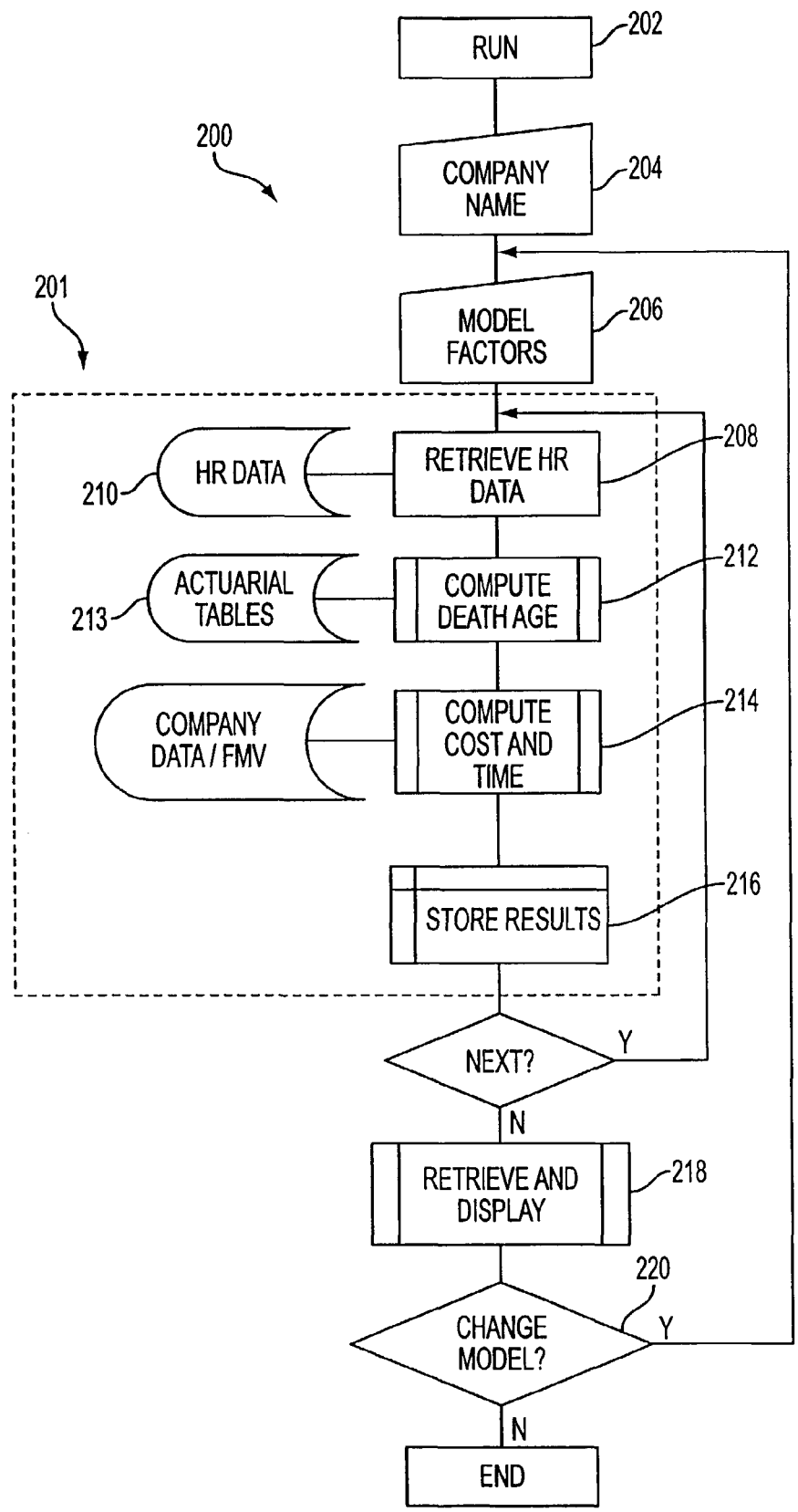
FIG. 3 is a flow chart of THE UNIQUE SOLUTION® Plan modeling program of the present invention.

The modeling program 200 is shown in FIG. 3. The Employer may choose to run step 202, a model based on selected employees or based upon cost and length of investment. For example, a program can be modeled for a top executive. Alternatively, the Employer may identify a group of top executives, a cash amount available for the program and a preferred length of time for the program. The modeling program 200 may be used to identify which top executives are most likely to meet the Employer's objectives.

The model program has two basic inputs: a company identity input 204 and model factors 206 input step. These two inputs may be combined or may each comprise multiple inputs. With regard to input 204, it is important to identify the company that is involved, or at least its basic financial data (stock performance, cash, etc.), and the pool factors. The pool factors may comprise any factor used to select individuals for modeling. Pool factors may include an employee's name, age, length of service with the company, management status, etc. Step 204 may include all of Company X's data prior to consulting with Company X. After this initial information is provided, a compute costs program 201 is executed. The compute cost routine 201 takes the input data from steps 204 and 206 and combines the data with human resource information provided at step 208. The routine calculates the working life and the death age of the participant at 212 using input data or actuarial tables 213. At step 214 the routing generates the cost information that is then stored and/or displayed in conjunction with the input data at step 216.

It should be noted that the input parameters may be entered in ranges. If ranges are input, the modeling program may compute and display the results in ranges. It is expressly contemplated that not all data points between the two ranges need to be immediately calculated. A zoom feature may be provided that re-calculates data within a range for more detailed financial analysis by the Employer.

The retrieved HR data 208 comes from an HR database 210. That database 210 can reside in a separate system. The HR data used by the modeling program 200 includes age, sex, marital status, age of spouse, health, and other employee welfare benefit data, etc. The retrieved HR data is used to compute the likely age of death of participants and working life at step 212 and computing the cost to the company 214 of the most likely time frame THE UNIQUE SOLUTION® Plan, CORE™ or the Alternate Plan will be completed in (the time period until the participant dies or working life) also at step 214. These computations may use information from internal databases or external databases. It is expressly contemplated that an interface program may be used to extract relevant information from existing databases. Alternatively, communication software may be used to obtain the relevant information from commercially available databases.

The modeling program 201 permits a number of different employees and company profiles to be analyzed. The results can be stored in the system 300 shown in FIG. 1 as shown in step 216 and be easily retrieved by the user at step 218. The results may be printed, displayed or otherwise sent to an intended recipient. Different employees or model factors can be selected at step 220 after the first set of results are retrieved and displayed in step 218.

It is important to recognize that at least the fair value or FMV and death ages of the participants are two items that are not known until the events occur. The uncertainty in these factors means that when results are analyzed, there are certain unknown factors. Thus, it is expressly contemplated that in an alternate embodiment the retrieve and display step 218 may comprise a weighting sub-routine that may be used to weigh those factors the Employer determines to be most important. For example, if the Employer determines that it may tie up ten million dollars in cash reserves but only for a time period of ten years, the time until working life terminates or death factor may be weighed more heavily. Pool participants can be identified who most likely will meet the company's objectives, and withdraw or die in ten years. Other factors that may be used in the weighing sub-routine include expiration date of options, type of options, Grant Price, length of employment or other data.

The weighing subroutine includes a list of all variables that the analysis is based upon which is retrieved and displayed. The Employer may then assign weights to each factor. A percentage scale or high, medium, low scale may be used. It is expressly contemplated that unassigned factors may be assigned a default value. After the data is analyzed in the conventional manner, the results are displayed based on the weigh of the factors and the effect that factor has on the end result. For example, a high designation on "age over 65" will result in those participants with ages over 65 being displayed first. If a high designation is given in another category, an individual satisfying both high designations will be listed first. Individuals with high designations in only one of the two categories will be listed below.

As those of ordinary skill in the art will appreciate, the computing steps required will depend on the input factors. The database information may likewise be inputted or retrieved from an available database.

C. Financial Management or Asset Account Administration Program

Once the company decides to implement the program and executes it, the management of the program shifts to the Financial Management Account recorded on the books of the company. The "asset account" is used to pay the life-insurance benefit premiums. The Financial Management Account may also monitor participant borrowing or a life insurance agent may perform this function. The Financial Management Account administration program may be implemented as a separate program than the modeling program above or may be combined therewith.

Figure 4:
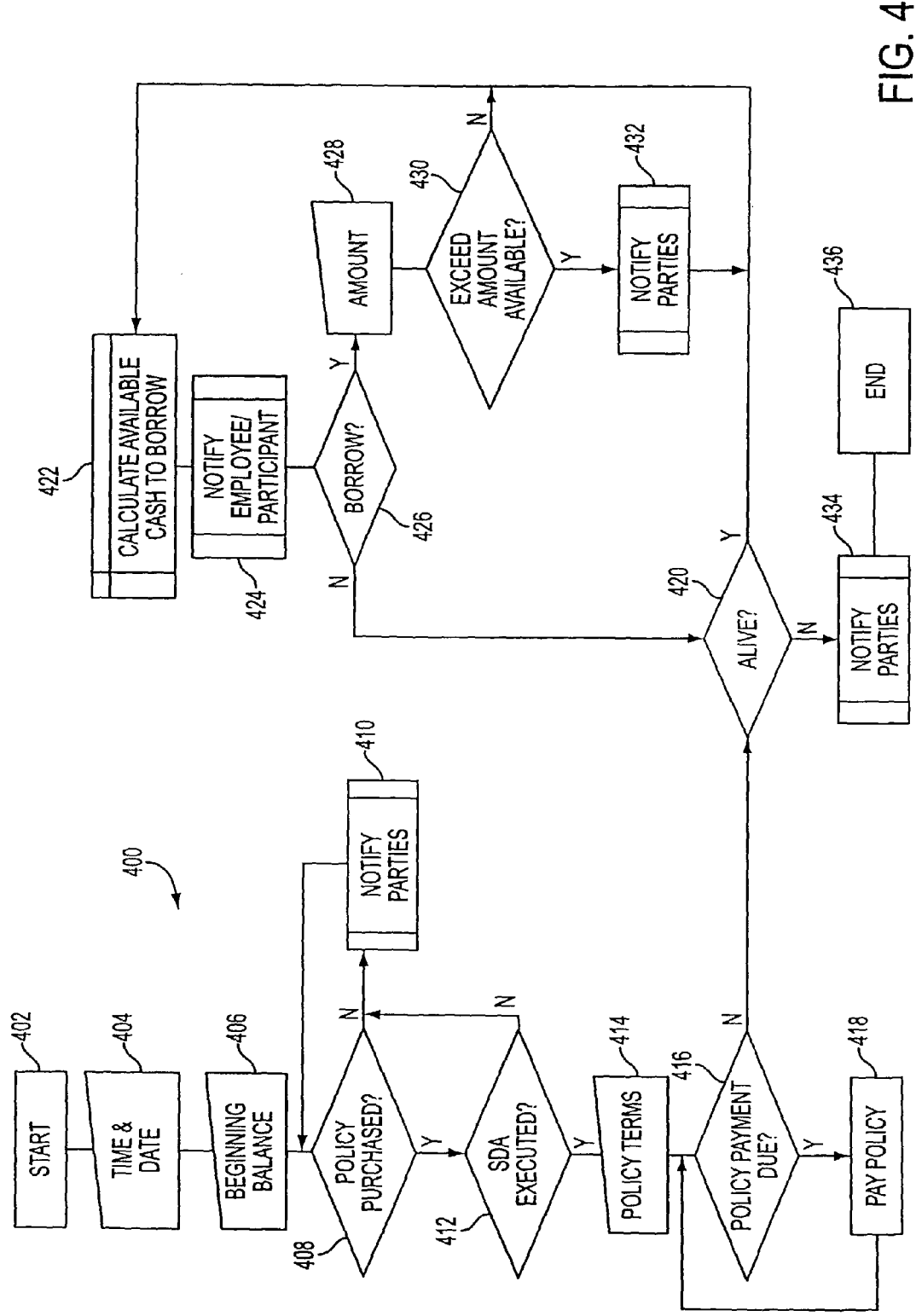
FIG. 4 is a flow chart of the asset account financial accounting management and operating program.

FIG. 4 shows a flow chart of an asset account administration program 400. The asset account management software 400 may be used to make sure that all of the formalities associated with implementing THE UNIQUE SOLUTION® Plan, CORE™ or the Alternate Plan are properly executed. For example, the software program may contain a Policy purchased input as well as a co-ownership endorsement executed input. If either of these inputs do not meet certain criteria, such as being properly executed and sent to an administrator, the asset account will not pay the n year premiums, e.g. over working life duration, on the Policy.

Once the program is successfully started at step 402, the program ensures the timely payment of the life insurance premiums. In step 404 the time and date are input. This input may be manual or electronic and is used to calculate when a certain number of effective years have past for tax purposes, e.g. working life. The beginning balance is input at step 406. The beginning balance is reasonable actuarially determined.

The account administration program then ensures that a Policy has been purchased at 408 and a co-ownership endorsement executed at 412. If either of these steps fails to meet certain pre-determined criteria the parties are notified at step 410. If the Policy and co-ownership endorsement are executed in electronic form, or subsequently placed in an electronic form, the software may be designed to automatically extract the required information, such as validation, proper naming of death beneficiary, etc. If the Policy terms are not automatically input, they are input at step 414.

The program then cycles through the working life and pays the actuarially determined amount against the Policy premiums at steps 416 and 418. It is expressly contemplated that the actuarially determined amount will be completed over the working life, but if it is not the program may be modified accordingly.

If the employee is still alive upon termination of the plan, then at step 420 the program calculates the amount that is available for borrowing on a tax free or reduced tax basis in step 422. The participant is notified in step 424, either manually or electronically that borrowing may begin. If the participant elects to borrow against the Policy, the amount that is being borrowed is input at 428. If the amount exceeds the amount available for borrowing, the parties are notified in step 432. This process continues until it is determined that the employee is no longer alive, at which point the parties are notified at step 434 and the program terminates at steps 436. Alternatively, where the Employer has carried the policy as an asset it may borrow against the policy in line with these provisions.

Those of ordinary skill in the art will recognize that this program may be modified and is not limited to the specific embodiment disclosed. For example, if the purchase of the Policy is automated, in addition to Policy information being input automatically, the program may be designed to exercise the co-ownership endorsement and automatically transfer funds upon the participant's death.

D. THE UNIQUE SOLUTION® Plan System

Figure 5:
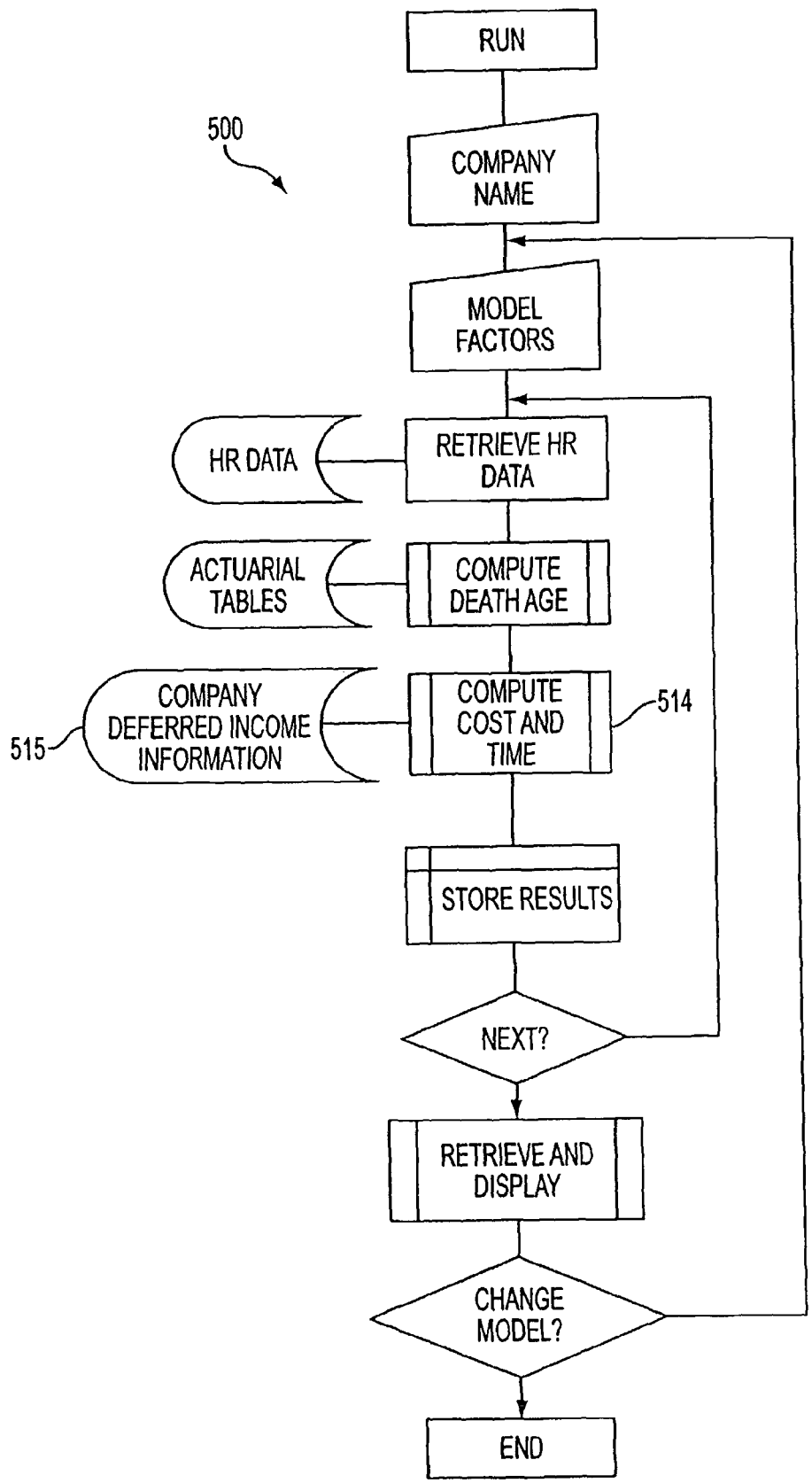
FIG. 5 is a flow chart of a second embodiment of THE UNIQUE SOLUTION® Plan of the present invention.

The present invention can be modified to work with all deferred compensation and benefit planning programs. This program has previously been referred to as THE UNIQUE SOLUTION® Plan. THE UNIQUE SOLUTION® Plan uses the deferred income obligation of the company as a Spread or gain The Employer's obligation to the Employee in the form of deferred compensation may be placed into a asset account and administered using a similar life insurance policy and endorsement with Internal Revenue Code Sections §83, 419, 419A and Table 2001. The cost to the company is likewise associated with the annually actuarially determined amount. FIG. 5 shows THE UNIQUE SOLUTION® Plan modeling program 500. Step 514 is modified to retrieve deferred income information as opposed to stock option information. The deferred income information may be retrieved from database 515 that may be the same or different from database 214 shown in FIG. 3.

E. CORE™, GLOBUS™, MOEBUS™

The CORE™, GLOBUS™, and MOEBUS™ Plan's system, methodology and modeling tracks that of THE UNIQUE SOLUTION® Plan set forth in Part D above, but is used for a non-profit employer, multinational corporations or pass-through entities and complies with Internal Revenue Service Code §61, 83, 457(f)(2)(c) and §457(e)(11) and §501(c)(3), 501(c)(5), §501(c)(6) and Table 2001. It also complies with FASB and IASB regulations.

F. The Alternate Plan System

The present invention can also be modified to work with a combination THE UNIQUE SOLUTION®/EWB Plan which has already been referred to as the Alternate Plan. FIG. 6 is a chart depicting costs, benefits and values for the Alternate Plan. At Year 1, the Employer purchases a life insurance policy (the Policy) for Employee A (45 years old). The Policy has an annual premium of $105,000 and a death benefit of $7,088,046 when purchased. Under the Alternate Plan, the premiums are split between the EWB Plan and THE UNIQUE SOLUTION®. Thus, $100,618 is used to fund the EWB Plan portion, and $4,382 is utilized to fund THE UNIQUE SOLUTION® portion. Under current IRS regulations, the $100,618 is deductible to the Employer when paid. Both the $100,618 and the $4,382 premium payments will be administered separately, and a distinct asset account may be established for THE UNIQUE SOLUTION® portion premiums. As noted in column 6 of FIG. 6, the EWB Plan portion of the life insurance benefit has no cash surrender value. THE UNIQUE SOLUTION® portion does accrue a cash benefit as an asset which for Employee A at age 64 which amounts to $4,024,922 in column 12. This amount may represent the level of deferred compensation to the Employee if carried on the books of the Employer and may be borrowed by the Employer with minimal or no tax consequences. The amount borrowed may reduce the size of the Employee's estate upon death and thereby decrease the amount of estate tax as well. Additionally, if the Employee owns the policy then he or she can access the asset accumulation income tax free.

Those of ordinary skill in the art will recognize the wide commercial applicability of the invention set forth above. Those of ordinary skill in the art will recognize the large commercial use of the apparatus and method herein described to companies and financial investor service providers. Those of ordinary skill in the art will recognize that the invention herein described and claimed may be modified and is not limited to the specific embodiments herein described.

I claim:

1. A method for identifying and administering a deferred award plan for the benefit of an employee, said method comprising the steps of:
    identifying from human resource data files at least one employee of an employer in said deferred award plan and storing employee related information on a memory device of a computer system;
    retrieving financial data related to a deferred compensation plan and to an employee welfare benefit plan corresponding to said identified employee;
    computing a fair value of benefits associated with said deferred compensation plan;
    establishing an asset in compliance with Financial Standards Board (FASB) or International Accounting Standards Board (IASB) rules based on said fair value of benefits, wherein the asset is accounted for in the books of the company;
    purchasing an individual or group life insurance policy having a predetermined benefit, said individual or group life insurance policy having a premium a first portion of which is associated with said deferred compensation plan and a second portion of which is associated with said employee welfare benefit plan, wherein said asset is used to fund said premium; and
    receiving, via the computer system, data indicative of an amount of funds that said employee intends to borrow from funds accumulated in said individual or group life insurance policy, determining, in the computer system, whether the amount of funds exceeds an amount of funds available, wherein the amount of funds available is restricted by a limit set forth in an endorsement, said limit reflecting a level of compensation according to said deferred compensation plan.

2. The method as claimed in claim 1, further comprising converting said financial data to a deferred award instrument plan format.

3. The method as claimed in claim 1, further comprising converting data related to said deferred compensation plan to a deferred award instrument plan format.

4. The method as claimed in claim 1, further comprising inputting weighing indicators corresponding to model factors.

5. The method as claimed in claim 4, further comprising displaying at least a predetermined portion of said retrieved and stored data based on said weighing indicators.

6. The method as claimed in claim 1, wherein said employee welfare benefit plan is qualified or non-qualified plan.

7. The method as claimed in claim 1, wherein estate taxes of said employee are reduced.

8. The method as claimed in claim 1, further comprising allowing said employer to borrow funds accumulated in said individual or group life insurance policy.

9. A system for implementing a deferred award plan comprising:
    a processor;
    memory operationally attached to said processor;
    an input device operationally attached to said processor;
    a display device operationally attached to said processor;
    an identifier for identifying at least one employee of an employer in said deferred award plan;
    a retrieving unit for retrieving financial data related to a deferred compensation plan and employee welfare benefit plan;

a processor for computing fair value of benefits associated with at least one of said deferred compensation and said employee welfare benefit plans;

an asset establishment unit for establishing an asset on the company books said asset being based on said fair value of benefits;

a purchasing unit for purchasing an individual or group life insurance policy having a predetermined benefit, said individual or group life insurance policy having a premium a first portion of which is associated with said deferred compensation plan and a second portion of which is associated with said employee welfare benefit plan, wherein said asset is used to fund said premium;

an executing unit for executing a co-ownership endorsement between said at least one employee and said employer; and a loan unit allowing said employee to borrow funds accumulated in said life insurance policy up to a limit set forth in said co-ownership endorsement, said limit reflecting said employee's deferred compensation or asset accumulation.

10. The system of claim 9, wherein said loan unit allows said employer to borrow funds accumulated in said life insurance policy.

11. The system of claim 9, further including a converter for converting said deferred compensation data to a deferred award instrument plan format.

12. The system of claim 9, further including a second converter for converting human resource data to a deferred award instrument plan format.

13. The system of claim 9, wherein said employee welfare benefit plan is qualified or non-qualified plan.

* * * * *